3,180,762
AIR OR OXYGEN DEPOLARIZED HYDROGEN CONCENTRATION CELL

Harry G. Oswin, Elmsford, N.Y., assignor to Leesona Corporation, Cranston, R.I., a corporation of Massachusetts
No Drawing. Filed Aug. 24, 1960, Ser. No. 51,495
5 Claims. (Cl. 136—86)

This invention relates to improved fuel cells and to their construction. More particularly the invention relates to an improved hydrogen diffusion fuel cell comprising two non-porous palladium or palladium silver alloy electrodes.

"Fuel cell," as used in this specification is the common name applied to an electrochemical cell capable of generating electrical energy through the electrochemical combustion of a fuel gas with an oxygen containing gas. Such cells have been fully described in the literature with the instant invention relating to a particular construction of a fuel cell having many outstanding characteristics. Before describing the instant novel fuel cell a brief description of the nature and construction of a simple fuel cell is believed worthwhile to promote the understanding of the function and importance of the present invention.

In general, the simplest fuel cell comprises a housing, two electrodes and an electrolyte which acts as an oxygen transferring medium. An oxidizing gas such as air under super-atmospheric pressure is circulated on one side of the oxidizing electrode and a fuel gas such as hydrogen under super-atmospheric pressure is circulated on one side of the other electrode. A three-phase interface, i.e., gas, electrolyte and solid, exists at each electrode where a process of adsorption and de-adsorption occurs generating an electrochemical force. When current is drained from the two electrodes there is a net flow of electrons from the fuel gas side through an external electrical circuit to the oxidizing gas side. According to the external electron flow convention the oxidizing gas electrode is the positive electrode and the fuel gas electrode is the negative electrode. Oxygen is consumed at the positive electrode surface and fuel gas is oxidized into products of combustion at the negative electrode surface. The result is accompanied by release of a portion of the energy of combustion as electrical energy while the remainder is released as heat.

The prior art fuel cells conventionally contained electrodes which were porous structures in which the three-phase interface of solid-gas-electrolyte was maintained by a suitable combination of pore size, pressure differential, and surface tension. However, such structures had numerous disadvantages. For example, it was impossible to maintain completely uniform pore size resulting in a system which operated with the smaller cells of the porous structure flooded with electrolyte due to capillary action or with gas bubbling through the large pores unused. To a great extent this problem was overcome by the use of a bi-porous structure wherein large pores fronted the fuel gas and the smaller pores faced the electrolyte. The three-phase interface occurred substantially at the bi-porous wall.

These bi-porous structures, however, were not the complete answer to the problem and in my co-pending applications of even date entitled "Improved Non-Porous Hydrogen Diffusion Fuel Cell Electrodes," having Serial Nos. 51,515 and 51,496, I have described electrodes fabricated from non-porous palladium or palladium silver alloys, which have been found to be remarkably effective in fuel cells.

The present invention is now concerned with a fuel cell system utilizing non-porous electrodes as both the fuel and oxidizing electrode. Thus, the invention eliminates to a large extent the difficulties of controlling the rates of diffusion of hydrogen within the cell and the problems encountered when water is formed during the operation of a hydrogen-oxygen or hydrogen-air fuel cell within a porous electrode structure. Accordingly, it is an object of the instant invention to provide a fuel cell which will sustain high current densities without accurate control of the pressure of the hydrogen fuel gas.

It is another object of the invention to provide a hydrogen-oxygen or hydrogen-air fuel cell system which is capable of using impure hydrogen as a fuel gas.

It is another object of this invention to provide a fuel cell system which operates without water being formed within the electrode structure or in the electrolyte.

These and other objects of the invention will be apparent from the following detailed description with particular emphasis being directed to the preferred embodiment.

The objects of the instant invention are accomplished by fabricating a fuel cell consisting of two palladium or palladium-silver alloy membranes containing an acid electrolyte between them. The cell can be illustrated graphically as follows:

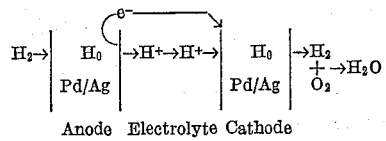

Anode   Electrolyte   Cathode

As indicated in the above figure, the hydrogen at the Pd-Ag anode membrane-electrolyte interface dissociates into protons and electrons. The electrons are drawn off and carried via an external route to the cathode, whereas the hydrogen ions pass to the cathode through the electrolyte. The hydrogen ions collect an electron and the atomic hydrogen emerges at the cathode outer gas surface for reaction with oxygen in the gas phase. The cell can thus be considered to be a hydrogen-concentration cell with the hydrogen pressure at the cathode being lowered, i.e., depolarized by the oxygen to the equilibrium decomposition pressure of water.

In the operation of the cell, in order to maintain good diffusion rates at the two electrodes, it is necessary to maintain differential hydrogen pressures at each electrode. This can be accomplished by maintaining a pressure over the electrolyte, preferably in the range of 5–1000 p.s.i.g. and a hydrogen electrode pressure greater than the electrolyte pressure by from 5–1000 p.s.i.g. With this differential hydrogen pressure the cell operates as an effective hydrogen concentration cell striving to reach a point of equilibrium.

The instant cells were found to exhibit excellent potential stability even after long periods of continuous operation. Hydrogen fuel diffused through the negative electrode at a constant and continuous rate. There was no blocking or flooding at the electrode by gaseous impurities or water. Since both the anode and cathode are constructed from Pd or Pd-Ag alloy membranes the concentration and purity of the electrolyte remained substantially constant with the formation of water occurring only at the gas side of the oxidizing electrode. The cell responded rapidly to altered conditions in the fuel cell system.

A particularly advantageous and surprising feature, described more fully in my above referred to applications entitled "Improved Non-Porous Hydrogen Diffusion Fuel Cell Electrodes," is the ability of the non-porous electrodes to act as their own metering valve. It would logically be expected that a fuel cell system at 250° C. would bubble hydrogen under open circuit conditions. However, in the instant system when the circuit is open the hydrogen does not diffuse through the electrodes, but as soon as the circuit is closed the electrode responds immediately and hydrogen gas is metered through. As is apparent this is a particularly desirable and worthwhile characteristic.

Since only hydrogen is diffused through the palladium or palladium-silver alloy membrane impure hydrogen gas, containing carbon dioxide, carbon monoxide, water, methane, ammonia, etc. can be used as the fuel gas. The hydrogen will diffuse through the membrane and the gaseous impurities can easily be removed by suitable venting at the fuel gas electrode. The impurities, being concentrated inside the membrane, cannot contaminate the electrolyte. Thus, a system capable of using relatively cheap impure hydrogen is an important feature of the instant invention.

Pure palladium membranes are suitable for electrode fabrication in the instant fuel cells, however it was found that palladium-silver alloys are surprisingly superior to pure palladium. Palladium-silver alloys containing from 5–40% by weight of silver are operable, with an alloy composed of about 25% silver and 75% palladium being preferred because of outstanding fuel cell electrode properties. The palladium-silver alloy membranes do not become brittle even after long periods of exposure to hydrogen under operating fuel cell conditions. Further, diffusion of hydrogen through a silver-palladium alloy was found to be approximately three times that of diffusion through pure palladium at 500° F. and polarization under identical conditions was not as great.

The instant hydrogen-diffusion fuel cells can be operated in a wide temperature range. However for good hydrogen diffusion it is desirable that the temperature of the system be in excess of 100° C. but not over 700° C., with the preferred range being in the neighborhood of 150–300° C. While fuel cell systems of the invention can be operated at lower temperatures, their behavior at such temperatures is somewhat erratic.

The thickness of the palladium or palladium-silver alloy membranes for use as the electrodes depends to a large degree upon the pressure differential to be applied across the membrane and upon the rapidity of diffusion desired. Diffusion of hydrogen gas through the membrane is proportional to the pressure differential across the membrane and the membrane's thickness. The minimum thickness is immaterial as long as the membrane is structurally able to withstand the necessary pressure of the fuel cell. The preferred range of thickness is from approximately .05 mil to 30 mils. The membranes can be fabricated as flat supported sheets, or as a corrugated or tubular construction. Usually tubular construction is preferred with the membranes being in the form of concentric tubes, with the space between containing electrolyte under pressure. Such a system could be pressurized conveniently up to 2000 p.s.i.g. using tubes of 0.003 inch thickness and having $\frac{1}{16}$ and $\frac{1}{8}$ inch outside diameters.

The instant electrodes can be operated with a variety of strong acid electrolytes such as sulfuric acid, phosphoric acid, etc. An outstanding feature of the instant fuel cell systems, as mentioned earlier, is that the formation of water occurs only at the oxidizing gas side of the oxidizing electrode. Thus, water does not effect the hydrogen diffusion and can be conveniently removed from the system by suitable means. The electrolyte concentration and purity remains substantially constant.

The following example is set forth to illustrate the preferred embodiment of the invention.

A fuel cell was fashioned containing two 75% palladium and 25% silver alloy electrodes in the form of concentric tubes. The space between the tubes was filled with a 50% aqueous sulfuric acid electrolytic solution maintained under a pressure of 50 p.s.i.g. The hydrogen gas was circulated within the internal tube under a pressure of 100 p.s.i. and oxygen gas was flooded around the outer tube to act as an oxidizing gas and depolarizer. The cell, operated at 500° F., sustained a current density of 160 amps/ft.$^2$.

The above cell when operated at 500° F. and a pressure differential of 100 p.s.i. over the electrolyte and 200 p.s.i. at the fuel electrode and using an impure fuel gas containing 90% hydrogen and 10% nitrogen sustained a current density of 310 amps/ft.$^2$.

The instant invention is not to be limited by the illustrated examples. It is possible to produce still other embodiments without departing from the inventive concept herein disclosed. Such embodiments are within the ability of one skilled in the art.

It is claimed and desired to be secured by Letters Patent:

1. A hydrogen-oxidant fuel cell comprising a non-porous hydrogen selective diffusion membrane anode and a non-porous hydrogen selective diffusion membrane cathode and containing an electrolyte between said anode and cathode; said non-porous membranes being composed of a member of the group consisting of palladium and palladium-silver alloy.

2. The fuel cell of claim 1 herein the non-porous membranes are composed of a palladium-silver alloy.

3. The fuel cell of claim 2 herein the alloy is composed of about 25% silver and 75% palladium.

4. The fuel cell of claim 1 herein the electrolyte is sulfuric acid.

5. The process of generating electrical current in a fuel cell comprising non-porous hydrogen selective diffusion membranes as the anode and cathode with an electrolyte positioned between said membranes, said membranes being composed of a member of the group consisting of palladium and palladium-silver alloy comprising feeding hydrogen to the hydrogen selective diffusion membrane anode of the cell, and maintaining a greater hydrogen partial pressure at the anode than the partial pressure of hydrogen at the surface of the hydrogen selective diffusion membrane cathode remote from the electrolyte, and removing hydrogen from the surface of the cathode remote from the electrolyte substantially as it is formed.

References Cited by the Examiner

UNITED STATES PATENTS

| 2,384,463 | 9/45 | Gunn et al. | 136—86 |
| 2,773,561 | 12/56 | Hunter | 183—115 |
| 2,860,175 | 11/58 | Justi | 136—86 |
| 2,901,523 | 8/59 | Justi et al. | 136—86 |
| 2,913,511 | 11/59 | Grubb | 186—86 |
| 3,020,327 | 2/62 | Ruetschi | 136—86 |

FOREIGN PATENTS 521,773  5/40  Great Britain.

OTHER REFERENCES

Krause et al.: Trans. of Electro Chemical Society, vol. LXVIII, 1935, pages 449–470.

JOHN H. MACK, *Primary Examiner.*

JOHN R. SPECK, MURRAY TILLMAN, *Examiners.*